(12) United States Patent
Shen et al.

(10) Patent No.: US 11,370,615 B2
(45) Date of Patent: Jun. 28, 2022

(54) ROBOTIC SHUTTLE SYSTEM FOR LOGISTICS AND CONTROL METHOD THEREOF

(71) Applicant: Wu Xi Galaxy Technology Company Limited, Wuxi (CN)

(72) Inventors: Lu Shen, Wuxi (CN); Chunguang Gu, Wuxi (CN); Yan Yang, Wuxi (CN)

(73) Assignee: WU XI GALAXY TECHNOLOGY COMPANY LIMITED, Wuxi (CN)

( * ) Notice: Subject to any disclaimer, the term of this patent is extended or adjusted under 35 U.S.C. 154(b) by 711 days.

(21) Appl. No.: 16/316,628

(22) PCT Filed: Feb. 12, 2018

(86) PCT No.: PCT/CN2018/076403
§ 371 (c)(1),
(2) Date: Jan. 10, 2019

(87) PCT Pub. No.: WO2019/104885
PCT Pub. Date: Jun. 6, 2019

(65) Prior Publication Data
US 2020/0216266 A1 Jul. 9, 2020

(30) Foreign Application Priority Data
Nov. 30, 2017 (CN) .......................... 201711232456.0

(51) Int. Cl.
*B65G 1/137* (2006.01)
*B60L 50/40* (2019.01)
(Continued)

(52) U.S. Cl.
CPC ............ *B65G 1/1375* (2013.01); *B60L 50/40* (2019.02); *B60L 50/66* (2019.02); *B60L 53/14* (2019.02);
(Continued)

(58) Field of Classification Search
CPC . B60L 53/14; B66F 9/063; G05D 2201/0216; Y02T 90/14
See application file for complete search history.

(56) References Cited

U.S. PATENT DOCUMENTS

2005/0135907 A1* 6/2005 Romano .............. A61G 7/1011
414/401
2013/0057210 A1* 3/2013 Nergaard ................ B60L 53/65
320/109
(Continued)

FOREIGN PATENT DOCUMENTS

| CN | 103171851 A | 6/2013 |
|---|---|---|
| CN | 104071542 A | 10/2014 |

(Continued)

*Primary Examiner* — Peter D Nolan
*Assistant Examiner* — Ce Li Li
(74) *Attorney, Agent, or Firm* — Bayramoglu Law Offices LLC

(57) ABSTRACT

A robotic shuttle system for logistics and a control method thereof are disclosed. The novel robotic shuttle system for logistics is compact in structure, convenient for disassembly and maintenance, and integrated intelligently, and may precisely realize the functions such as moving, lifting, carrying, fault warning, etc. The novel robotic shuttle system for logistics includes a novel logistics shuttle robot and a WCS automatic storage system; the novel logistics shuttle robot includes a vehicle body, a straight motor, a straight wheel, a transverse motor, a transverse wheel, a position sensor, a lifting motor, an encoder, a PLC controller, a lifting position sensor, a telescopic fork, a finger, a telescopic fork position sensor, a telescopic fork motor, and an antenna; and the bottom of the vehicle body is respectively provided with the straight wheel and the transverse wheel.

2 Claims, 8 Drawing Sheets

(51) Int. Cl.
*B60L 50/60* (2019.01)
*B60L 53/14* (2019.01)
*B65G 1/04* (2006.01)
*B66F 9/06* (2006.01)
*G05D 1/02* (2020.01)

(52) U.S. Cl.
CPC ............ B65G 1/0492 (2013.01); B66F 9/063 (2013.01); G05D 1/0212 (2013.01); *B60L 2200/42* (2013.01); *B65G 2203/0283* (2013.01); *B65G 2203/04* (2013.01); *G05D 2201/0216* (2013.01)

(56) References Cited

U.S. PATENT DOCUMENTS

| | | | | |
|---|---|---|---|---|
| 2013/0190956 A1* | 7/2013 | Zhamu | ................. | B60W 20/00 |
| | | | | 701/22 |
| 2014/0343801 A1* | 11/2014 | Whitfield, Jr | ........... | B65F 3/041 |
| | | | | 701/49 |

FOREIGN PATENT DOCUMENTS

| | | | |
|---|---|---|---|
| CN | 105631616 A | 6/2016 | |
| CN | 105858030 A | 8/2016 | |
| WO | 2015131924 A1 | 9/2015 | |

\* cited by examiner

ROBOTIC SHUTTLE SYSTEM FOR LOGISTICS AND CONTROL METHOD THEREOF

CROSS REFERENCE TO RELATED APPLICATIONS

This application is the national phase entry of International Application PCT/CN2018/076403, filed on Feb. 12, 2018, which is based upon and claims priority to Chinese Patent Application No. 201711232456.0, filed on Nov. 30, 2017, the entire contents of which are incorporated herein by reference.

TECHNICAL FIELD

The present invention relates to the technical field of shuttles for freight transportation, specifically to a robotic shuttle system for logistics and a control method thereof.

BACKGROUND

Shuttle is used for storing, loading and unloading of goods. For example, the shuttle may be used to carry goods packaged by logistics-specific containers, cartons, etc., meanwhile, RGV may be used to move goods in or out of various horizontal levels of storage racking, and may also be used for cargo consolidation or goods sorting. Currently, most of the shuttles work by using a motor driven by electric power, and the shuttles are effectively controlled by a programmable logic controller (PLC) through a plurality of sensors. However, how to reasonably plan the operation of the robotic shuttle system for logistics has always been a problem to be solved and enhanced.

SUMMARY

The objective of the present invention is to provide a shuttle for logistics, which is compact in structure, convenient for disassembly and maintenance, and integrated intelligently, and may precisely realize the functions such as traveling, lifting, carrying, providing fault warning, etc.

The technical solution for solving the technical problems of the present invention is as follows. A robotic shuttle system for logistics includes a logistics shuttle robot and a. WCS automatic storage system; the logistics shuttle robot includes a vehicle body, a straight motor, a straight wheel, a transverse motor, a transverse wheel, a position sensor, a lifting motor, an encoder, a PLC controller, a lifting position sensor, a telescopic fork, a finger, a telescopic fork position sensor, a telescopic fork motor, and an antenna. The bottom of the vehicle body is respectively provided with the straight wheel and the transverse wheel, and a level of the straight wheel is lower than a level of the transverse wheel. The straight motor and the transverse motor are arranged on the vehicle body, respectively. The straight motor is linked to the straight wheel, and the transverse motor is linked to the transverse wheel. The straight wheel and the traverse wheel are respectively provided with the encoder. The position sensor, the lifting motor, the PLC controller and the lifting position sensor are arranged on the vehicle body. The finger is arranged on the vehicle body, and the finger is in sliding fit with the vehicle body and driven by the telescopic fork motor. The telescopic fork fits with the finger, and the telescopic fork position sensor is arranged on the vehicle body. The logistics shuttle robot further includes a supercapacitor, a lithium battery, and a charging contact. The supercapacitor is electrically connected to the lithium battery, and the charging contact is arranged on the vehicle body and electrically connected to the supercapacitor. The straight motor, the traverse motor, the lifting motor and the telescopic fork motor are electrically connected to the PLC controller through a controller in sequence. The position sensor, the lifting position sensor, the telescopic fork position sensor, and the encoder are electrically connected to the PLC controller. The signal of the PLC controller is connected to the WCS automatic storage system through the antenna.

Preferably, a second telescopic fork rail sensor is further included. A second telescopic fork rail sensor is arranged on a sidewall of the vehicle body.

The technical solution for solving the technical problems of the present invention is as follows. A control method of a robotic shuttle system for logistics, characterized in that, the control method includes the following steps:

step 1: constructing a storage model by a WCS automatic storage system according to an actual warehouse route;

step 2: sending a movement instruction to a PLC controller by the WCS automatic storage system through an antenna, sending a specific position of the movement to a straight motor and an encoder by the PLC controller to perform the movement of the vehicle body, feeding back the travel distance of the vehicle body to the PLC controller through the encoder, feeding back a position signal of the vehicle body when reaching the specific position to the PLC controller by a position sensor, and feeding back the position signal of the vehicle body to the WCS automatic storage system by the PLC controller through the antenna;

step 3: sending an information of picking up goods to the PLC controller by the WCS automatic storage system through the antenna, sending information of moving in and out to the telescopic fork by the PLC controller to make the telescopic fork move out from the side of the vehicle body, when feeding back a signal that the telescopic fork reaches the specific position to the PLC controller by the telescopic fork sensor, feeding back the signal that the telescopic fork reaches the specific position to the WCS automatic storage system by the PLC controller;

step 4: sending information of picking up goods to the PLC controller by the WCS automatic storage system through the antenna, at this moment, sending information to the finger by the PLC controller to rotate the finger, so that the goods are picked up, feeding back the picked-up information to the WCS automatic storage system by the PLC controller through the antenna;

step 5: sending information of moving goods to the vehicle body to the PLC controller by the WCS automatic storage system through the antenna, processing and then sending the information to the telescopic fork by the PLC controller, the telescopic fork retracting and receiving information that the telescopic fork is retracted by the PLC controller through the telescopic fork sensor, feeding back the position information to the WCS automatic storage system by the PLC controller;

step 6: sending a movement instruction of the vehicle body to the PLC controller by the WCS automatic storage system through the antenna, sending a specific position of the movement to the straight motor and the encoder by the PLC controller to perform the movement of the vehicle body, feeding back the travel distance of the vehicle body to the PLC controller through the encoder, feeding back a position signal of the vehicle body when reaching the specific position to the PLC controller by the position sensor, and feeding back the position signal of the vehicle body to the WCS automatic storage system by the PLC controller through the antenna.

Preferably, when the WCS automatic storage system sends the movement instruction that traverse movement is required to the PLC controller through the antenna, the WCS automatic storage system sends the movement instruction of the vehicle body to the PLC controller through the antenna, the PLC controller sends the specific position of the movement to the lifting motor, and the lifting motor lifts the traverse wheel; when the lifting position sensor receives the signal that the traverse wheel is lifted to the specific position, the PLC controller feeds back the reached signal to the WCS automatic storage system through the antenna, and then the WCS automatic storage system sends a movement signal to the PLC controller through the antenna, the PLC controller sends a specific position of the movement to the traverse motor and the encoder to perform the movement of the vehicle body after receiving the movement signal, and feeds back the travel distance of the vehicle body to the PLC controller through the encoder, the position sensor feeds back the position signal of reaching the specific position to the PLC controller, the PLC controller feeds back the position signal to the WCS automatic storage system through the antenna.

The beneficial effects of the invention are as follows. Robotic shuttle system for logistics and control method thereof of the present invention, on one hand, has a simple and compact structure in design, and designs each mechanism of the whole machine through a modularization design to facilitate the assembly, disassembly and maintenance; at the same time, functions such as straight movements, transverse movements and precise positioning may be realized, operations such as lifting of the vehicle body, and carrying goods through the finger may be completed, which is precisely controlled, and may find a possible fault and can provide timely warning.

Figure 1:
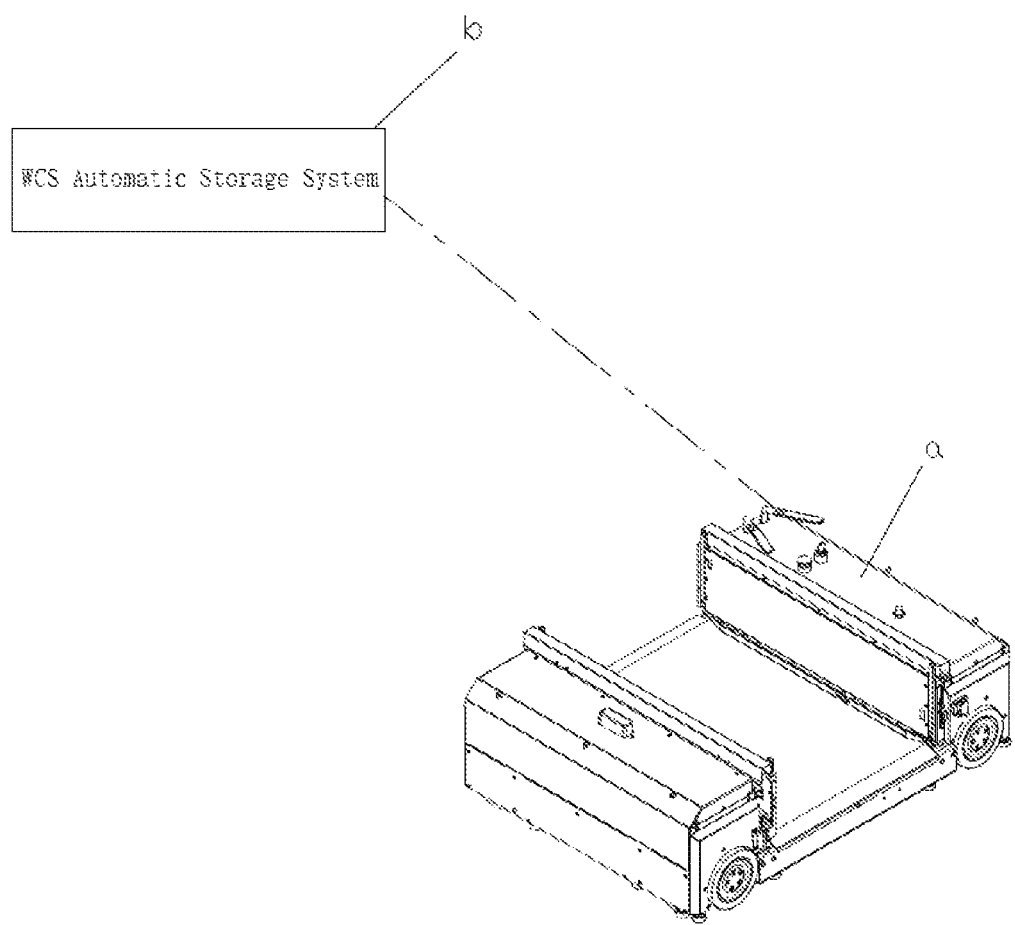
FIG. 1 is a schematic diagram of the system structure of the robotic shuttle system for logistics of the present invention.
Figure 2:
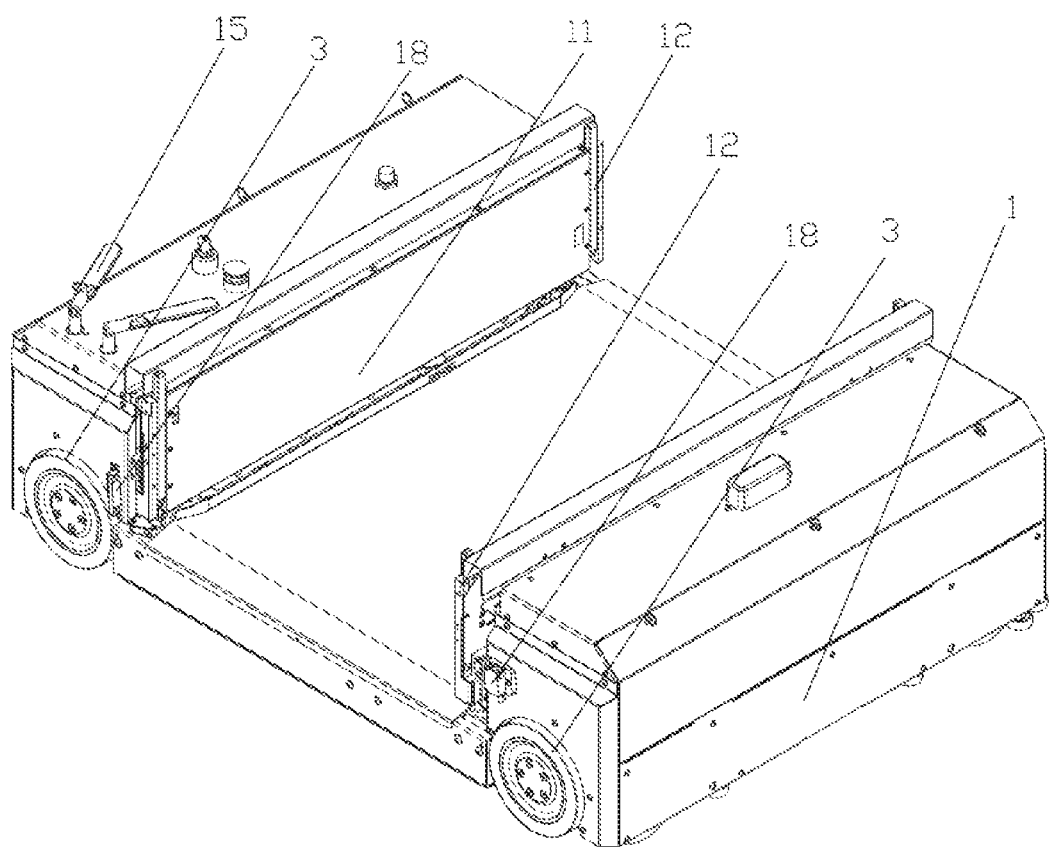
FIG. 2 is a structural diagram of the shuttle for logistics of the present invention from one side.
Figure 3:
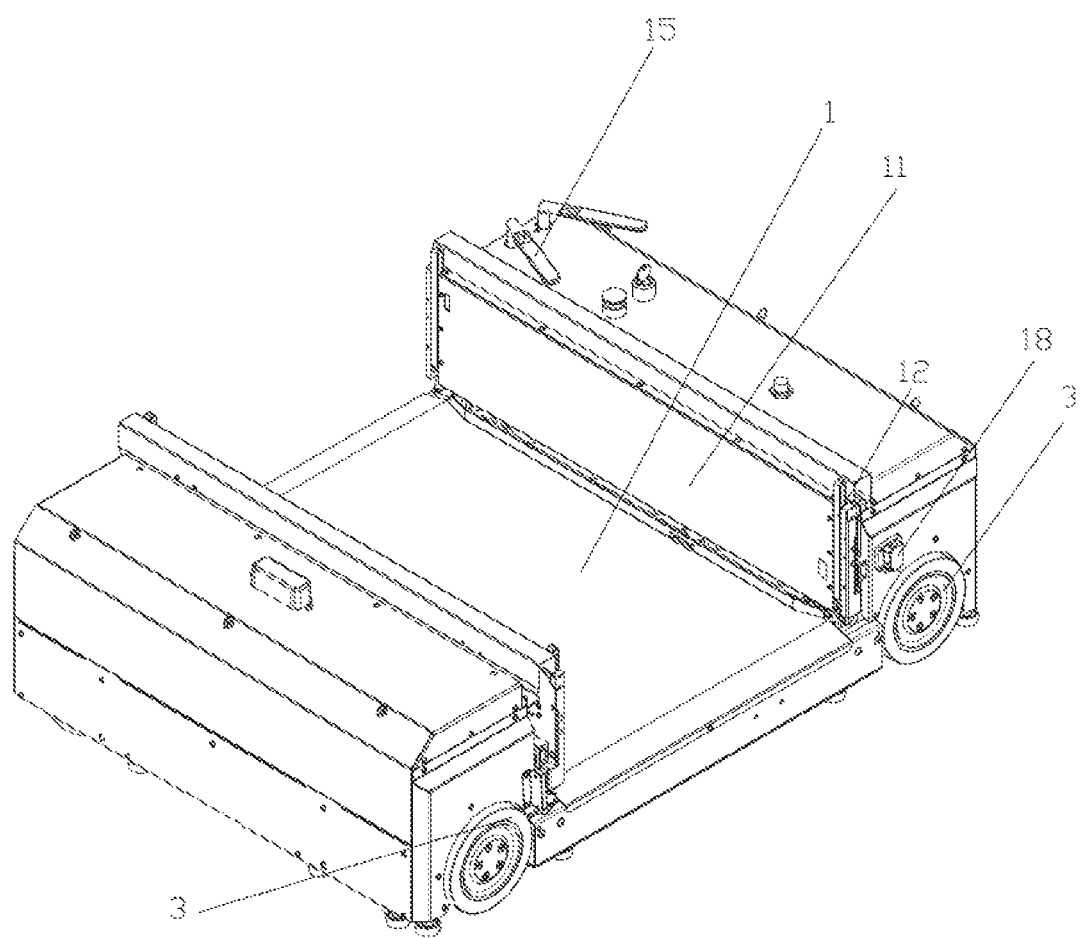
FIG. 3 is a structural diagram of the shuttle for logistics of the present invention from another side.
Figure 4:
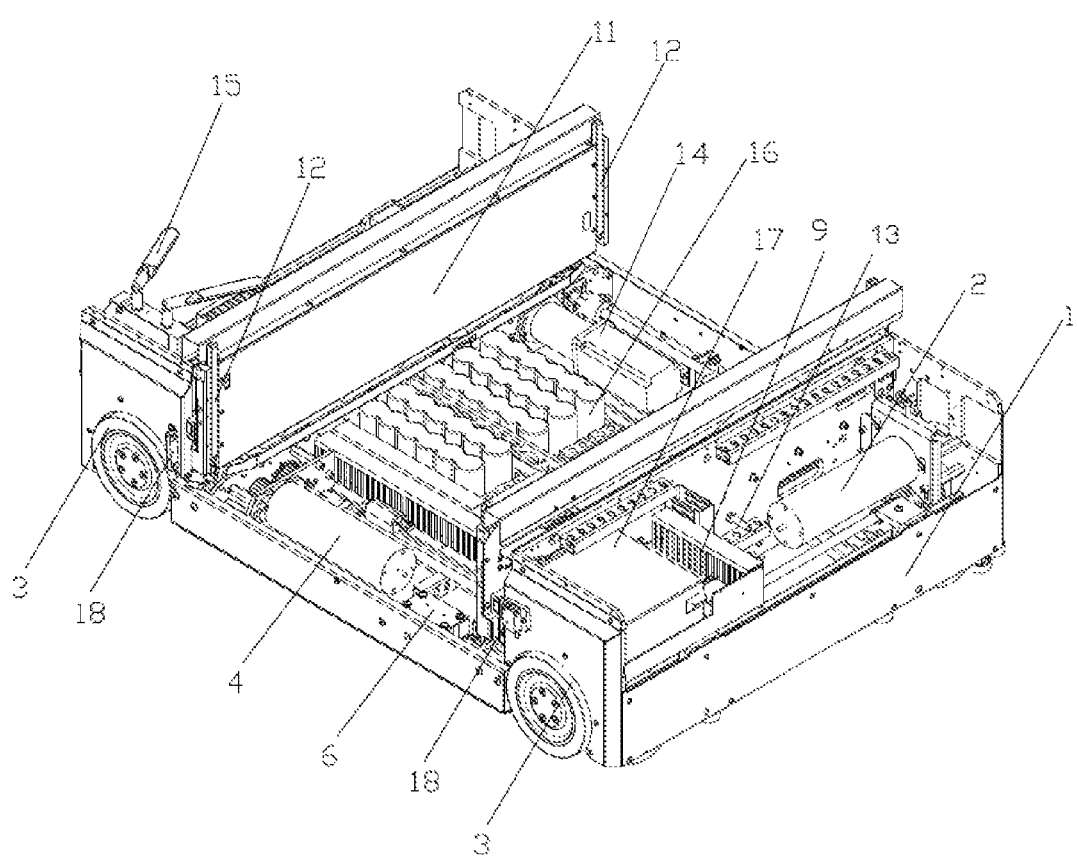
FIG. 4 is a structural diagram of the interior of the shuttle for logistics of the present invention from one side.
Figure 5:
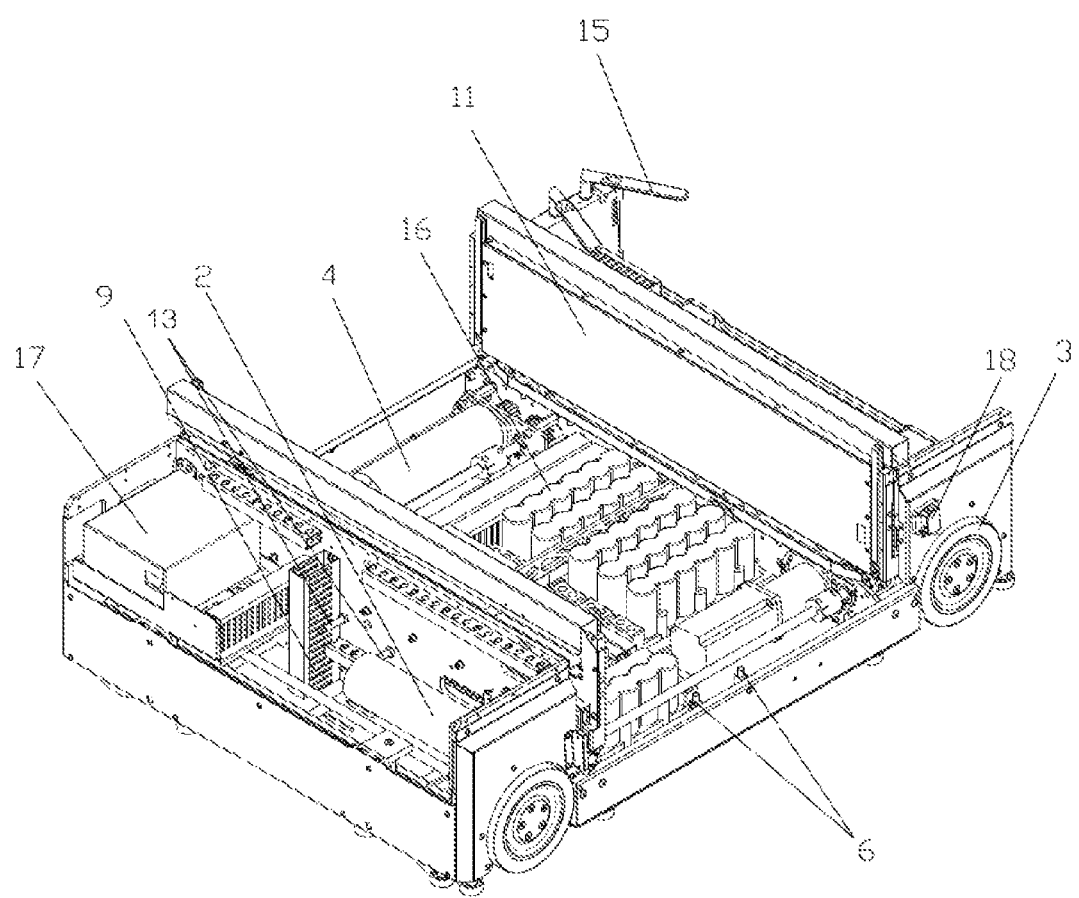
FIG. 5 is a structural diagram of the interior of the shuttle for logistics of the present invention from another side.
Figure 6:
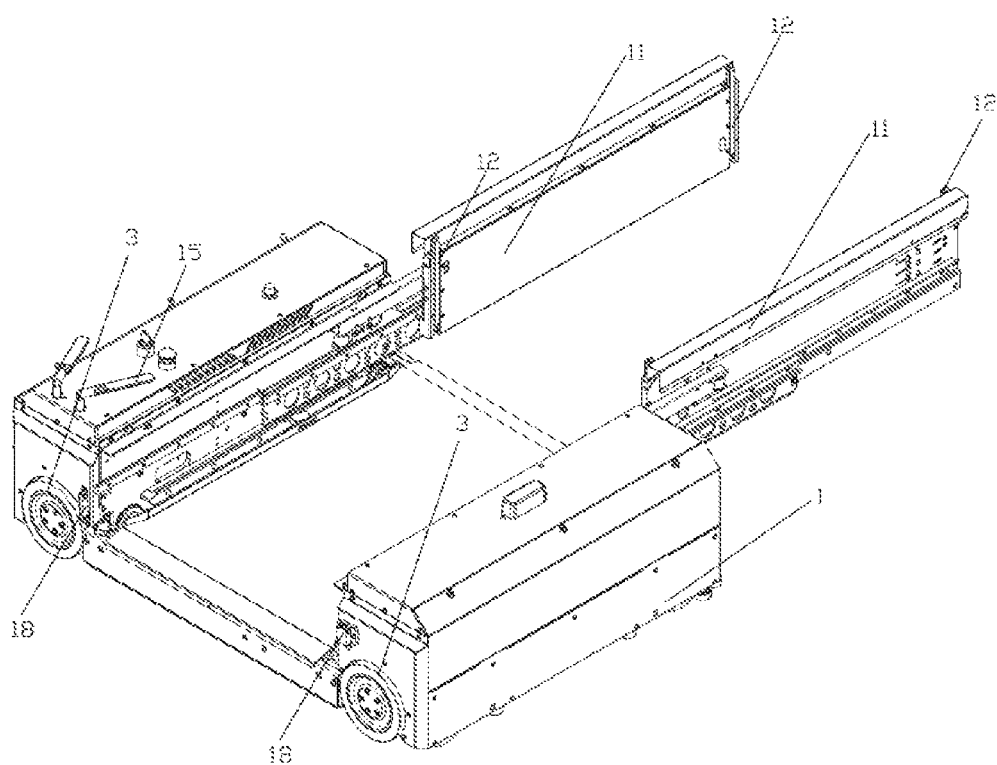
FIG. 6 is a structural diagram of the shuttle for logistics in the state of cargo canvassing of the present invention.
Figure 7:
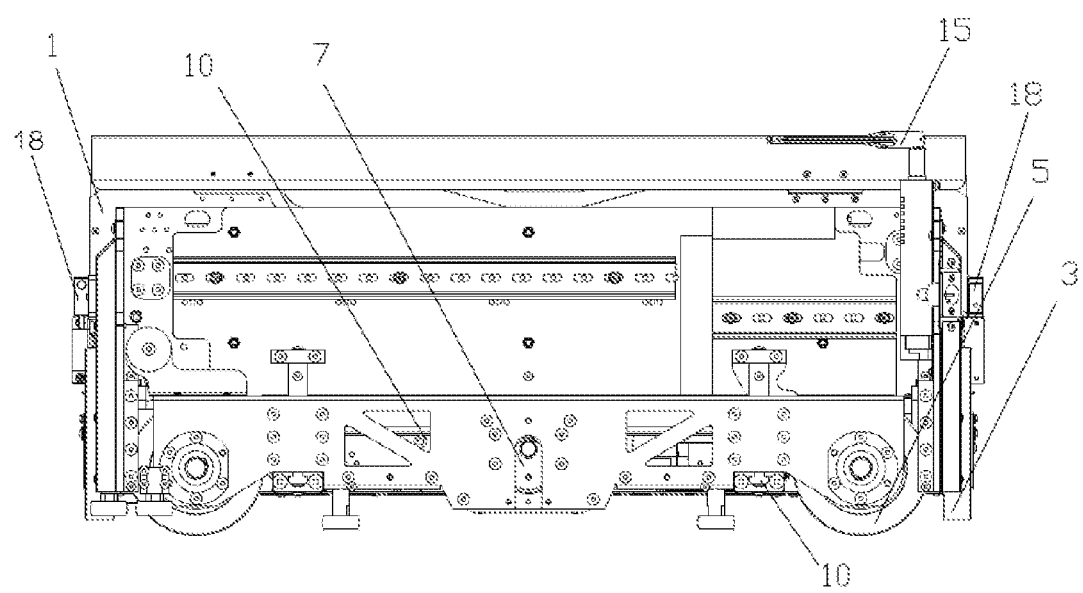
FIG. 7 is a side view of the shuttle for logistics of the present invention.
Figure 8:
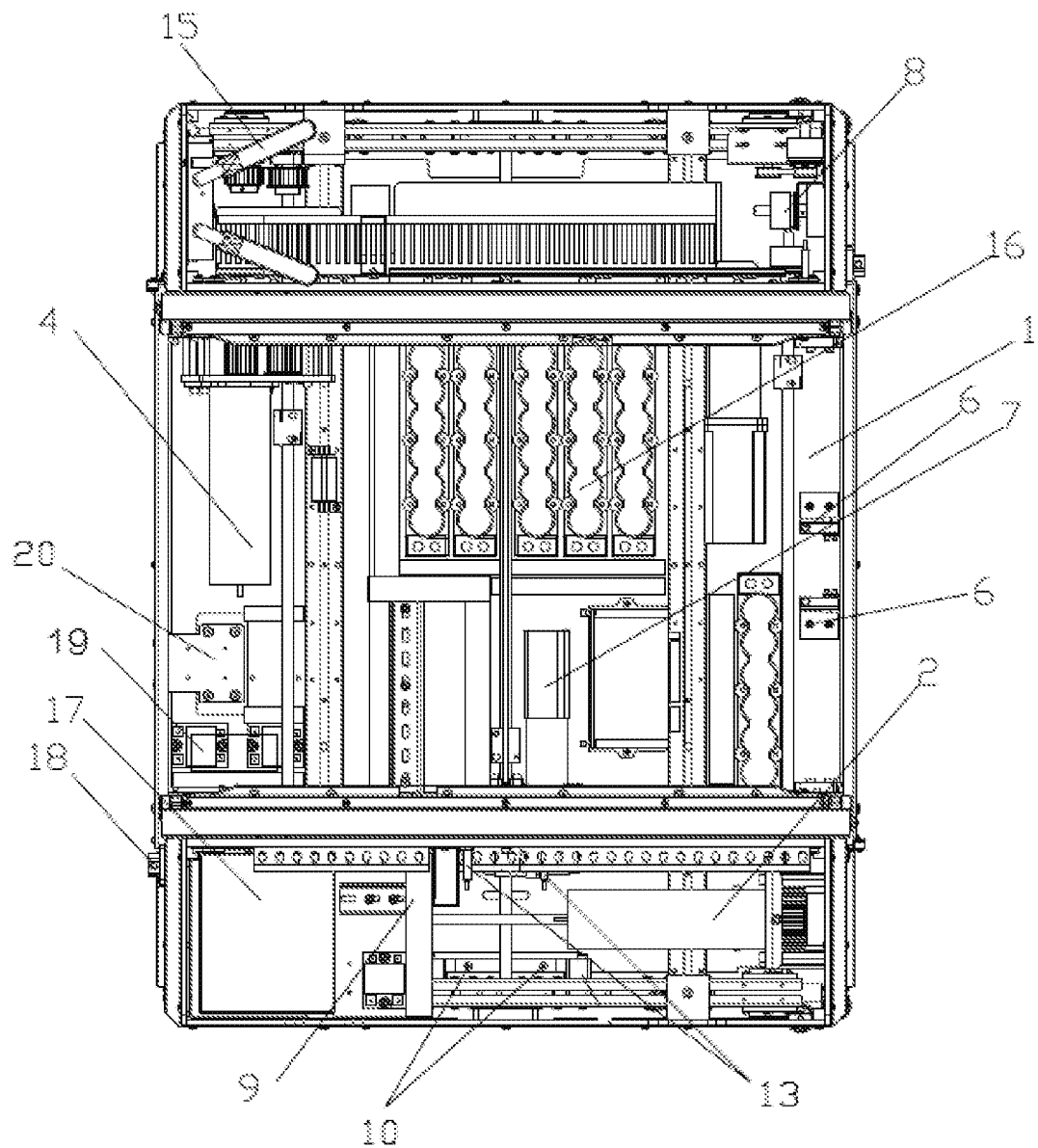
FIG. 8 is a top view of the shuttle for logistics of the present invention.

In the drawings, a. logistics shuttle robot, b. WCS automatic storage system, 1. vehicle body, 2. straight motor, 3. straight wheel, 4. transverse motor, 5. transverse wheel, 6. position sensor, 7. lifting motor, 8. encoder, 9. PLC controller, 10. lifting position sensor, 11. telescopic fork, 12. finger, 13. telescopic fork position sensor, 14. telescopic fork motor, 15. antenna, 16. supercapacitor, 17. lithium battery, 18. second telescopic fork rail sensor, 19. controller, 20. charging contact.

DETAILED DESCRIPTION OF THE EMBODIMENTS

The present invention is further described in detail with reference to the drawings. The drawings are merely simplified schematic diagrams, and are only used to explain the basic structure of the present invention in an exemplified way. Therefore, only components related to the present invention are shown.

As shown in the figures, a robotic shuttle system for logistics includes logistics shuttle robot a and WCS automatic storage system b; the logistics shuttle robot a includes vehicle body 1, straight motor 2, straight wheel 3, transverse motor 4, transverse wheel 5, position sensor 6, lifting motor 7, encoder 8, PLC controller 9, lifting position sensor 10, telescopic fork 11, finger 12, telescopic fork position sensor 13, telescopic fork motor 14, and antenna 15. The bottom of the vehicle body 1 is respectively provided with the straight wheel 3 and the transverse wheel 5, and a level of the straight wheel 3 is lower than a level of the transverse wheel 5. The straight motor 2 and the transverse motor 4 are arranged on the vehicle body 1, respectively. The straight motor 2 is linked to the straight wheel 3, and the transverse motor 4 is linked to the transverse wheel 5. The straight wheel 3 and the traverse wheel 5 are respectively provided with the encoder 8. The position sensor 6, the lifting motor 7, the PLC controller 9 and the lifting position sensor 10 are arranged on the vehicle body 1. The telescopic fork 11 is arranged on the vehicle body 1, and the telescopic fork 11 is in sliding fit with the vehicle body 1 and driven by the telescopic fork motor 14. The finger 12 fits with the telescopic fork 11, and the telescopic fork position sensor 13 is arranged on the vehicle body 1. The logistics shuttle robot further includes supercapacitor 16, lithium battery 17, and charging contact 20. The supercapacitor 16 is electrically connected to the lithium battery 17, and the charging contact 20 is arranged on the vehicle body 1 and electrically connected to the supercapacitor 16. The straight motor 2, the traverse motor 4, the lifting motor 7 and the telescopic fork motor 14 are electrically connected to the PLC controller 9 through controller 19 in sequence. The position sensor 6, the lifting position sensor 10, the telescopic fork position sensor 13, and the encoder 8 are electrically connected to the PLC controller 9. The signal of the PLC controller 9 is connected to the WCS automatic storage system b through the antenna 15.

The logistics shuttle robot further includes the second telescopic fork rail sensor 18. The second telescopic fork rail sensor 18 is arranged on a sidewall of the vehicle body 1.

A control method of a robotic shuttle system for logistics, includes the following steps:

step 1: a storage model is constructed by the WCS automatic storage system b according to an actual warehouse route;

step 2: a movement instruction is sent to the PLC controller 9 by the WCS automatic storage system b through the antenna 15, a specific position of the movement is sent to the straight motor 2 and the encoder 8 by the PLC controller 9 to perform the movement of the vehicle body 1, the travel distance of the vehicle body 1 is fed back to the PLC controller 9 through the encoder 8, a position signal of the vehicle body when reaching the specific position is fed back to the PLC controller 9 by the position sensor 6, and the position signal of the vehicle body is fed back to the WCS automatic storage system b by the PLC controller through the antenna;

step 3: an information of picking up goods is sent to the PLC controller by the WCS automatic storage system b through the antenna, the information of moving in and out is sent to the telescopic fork by the PLC controller to make the telescopic fork move out from the side of the vehicle body, when a signal that the telescopic fork reaches the specific position is fed back to the PLC controller by the telescopic fork sensor, the signal that the telescopic fork reaches the specific position is fed hack to the WCS automatic storage system b by the PLC controller;

step 4: the information of picking up goods is sent to the PLC controller by the WCS automatic storage system b through the antenna, at this moment, the information is sent to the finger by the PLC controller to rotate the finger, so that the goods are picked up, the picked-up information is fed back to the WCS automatic storage system b by the PLC controller through the antenna;

step 5: the information of moving goods to the vehicle body is sent to the PLC controller by the WCS automatic storage system b through the antenna, the information is processed and then sent to the telescopic fork by the PLC controller, the telescopic fork retracts and the PLC controller receives information that the telescopic fork is retracted through the telescopic fork sensor, the position information is fed back to the WCS automatic storage system b by the PLC controller;

step 6: a movement instruction of the vehicle body is sent to the PLC controller by the WCS automatic storage system b through the antenna, a specific position of the movement is sent to the straight motor 2 and the encoder 8 by the PLC controller 9 to perform the movement of the vehicle body 1, the travel distance of the vehicle body 1 is fed back to the PLC controller 9 through the encoder 8, a position signal of the vehicle body when reaching the specific position is fed back to the PLC controller 9 by the position sensor 6, and the position signal of the vehicle body is fed back to the WCS automatic storage system b by the PLC controller through the antenna.

When the WCS automatic storage system b sends the movement instruction that traverse movement is required to the PLC controller 9 through the antenna 15, the WCS automatic storage system b sends the movement instruction of the vehicle body to the PLC controller through the antenna, the PLC controller 9 sends the specific position of the movement to the lifting motor, and the lifting motor lifts the traverse wheel; when the lifting position sensor receives the signal that the traverse wheel is lifted to the specific position, the PLC controller 9 feeds back the signal to the WCS automatic storage system b through the antenna, and then the WCS automatic storage system b sends a movement signal to the PLC controller through the antenna, the PLC controller sends a specific position of the movement to the traverse motor 4 and the encoder 8 to perform the movement of the vehicle body 1 after receiving the movement signal, and feeds back the travel distance of the vehicle body 1 to the PLC controller 9 through the encoder 8, the position sensor 6 feeds back the position signal of reaching the specific position to the PLC controller 9, the PLC controller feeds back the position signal to the WCS automatic storage system b through the antenna.

According to the above-mentioned ideal embodiment of the present invention, through the above description, various modifications and changes can be made without departing from the scope of the technical thoughts of the present invention by those skilled in the art. The technical scope of the present invention is not limited to the content of the specification, and must be determined according to the scope of the claims.

What is claimed is:

1. A robotic shuttle system for logistics, comprising a logistics shuttle robot and a WCS automatic storage system; wherein the logistics shuttle robot comprises a vehicle body, a straight motor, a straight wheel, a transverse motor, a transverse wheel, a position sensor, a lifting motor, an encoder, a PLC controller, a lifting position sensor, a telescopic fork, a finger, a telescopic fork position sensor, a telescopic fork motor, and an antenna;

a bottom of the vehicle body is respectively provided with the straight wheel and the transverse wheel, and a level of the straight wheel is lower than a level of the transverse wheel;

the straight motor and the transverse motor are arranged on the vehicle body, respectively, the straight motor is linked to the straight wheel, and the transverse motor is linked to the transverse wheel;

the straight wheel and the traverse wheel are respectively provided with the encoder;

the position sensor, the lifting motor, the PLC controller and the lifting position sensor are arranged on the vehicle body;

the telescopic fork is arranged on the vehicle body, and the telescopic fork is in a sliding fit with the vehicle body and the telescopic fork is driven by the telescopic fork motor, the finger fits with the telescopic fork, the telescopic fork position sensor is arranged on the vehicle body;

the logistics shuttle robot further comprises a supercapacitor, a lithium battery, and a charging contact, the supercapacitor is electrically connected to the lithium battery, and the charging contact is arranged on the vehicle body and electrically connected to the supercapacitor;

the straight motor, the traverse motor, the lifting motor and the telescopic fork motor are electrically connected to the PLC controller through a controller in sequence;

the position sensor, the lifting position sensor, the telescopic fork position sensor, and the encoder are electrically connected to the PLC controller; and the PLC controller performs a wireless local area network transmission through the antenna, and a signal of the PLC controller is connected to the WCS automatic storage system through the antenna.

2. The robotic shuttle system for logistics of claim 1, wherein a second telescopic fork rail sensor is further included, and the second telescopic fork rail sensor is arranged on a sidewall of the vehicle body.

* * * * *